Feb. 12, 1929.

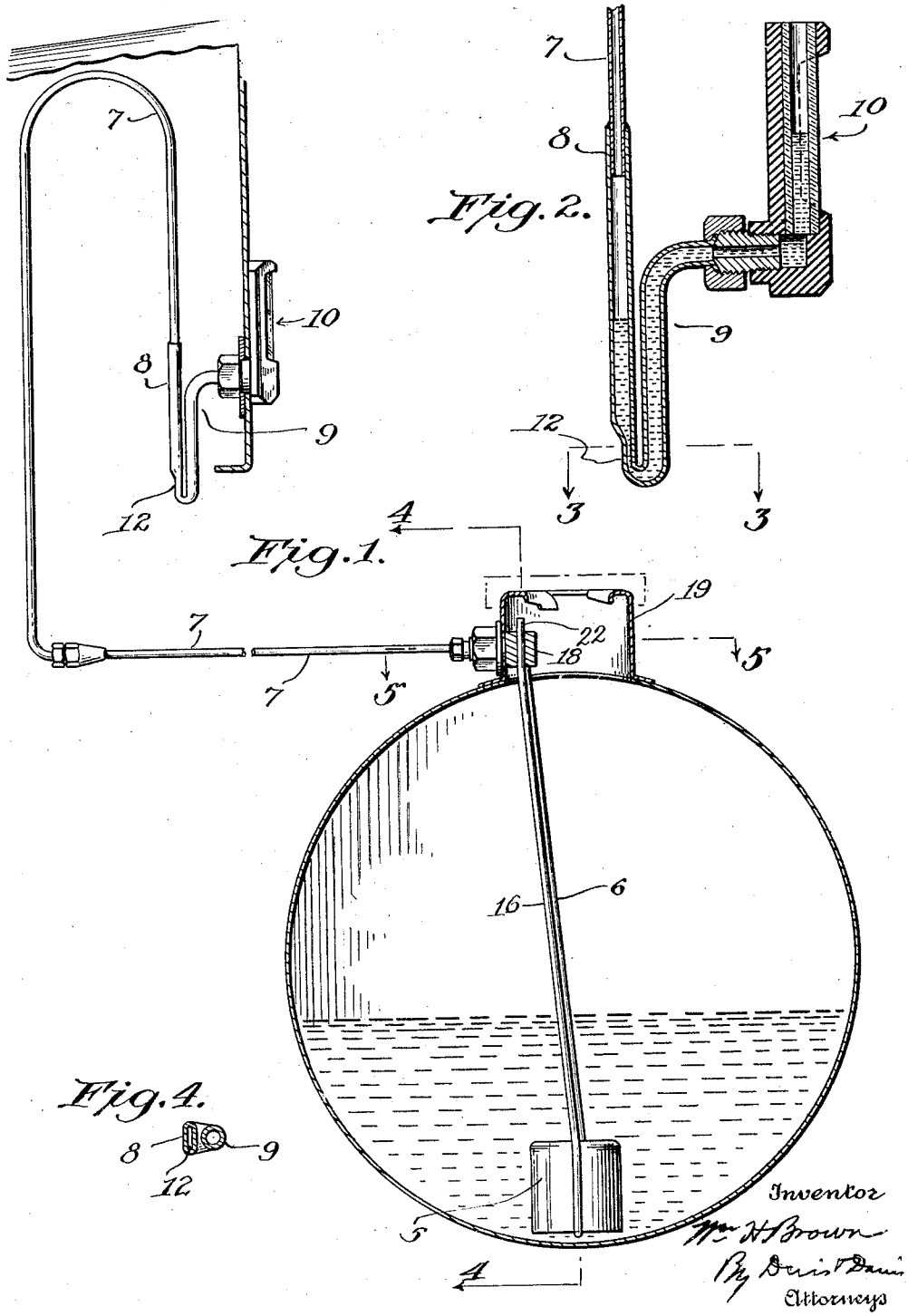

W. H. BROWN 1,701,769

LIQUID LEVEL GAUGE

Filed July 10, 1926  2 Sheets-Sheet 2

Inventor
William H. Brown
By Davis & Davis
Attorneys

Patented Feb. 12, 1929.

1,701,769

UNITED STATES PATENT OFFICE.

WILLIAM H. BROWN, OF CLEVELAND, OHIO.

LIQUID-LEVEL GAUGE.

Application filed July 10, 1926. Serial No. 121,597.

This invention relates to that type of gauge in which the hydrostatic head of the liquid in the tank determines the position of the liquid in a gauge-glass, the usual construction embodying an air-bell at the bottom of the tank connected by a small-bore air-tube with the pressure-leg of the usual U gauge tube; and the object of this invention is to simplify and improve the construction to the end that the gauge will be more reliable under the great variety of conditions under which these gauges are required to perform their function on an automotive vehicle, as more fully hereinafter set forth.

In the drawing—

Fig. 1 is a view showing the general arrangement of my improved apparatus;

Fig. 2 is a vertical sectional view of the gauge and the adjacent parts;

Figs. 4, 5, 6 and 7 are views of details hereinafter described.

Figure 3:
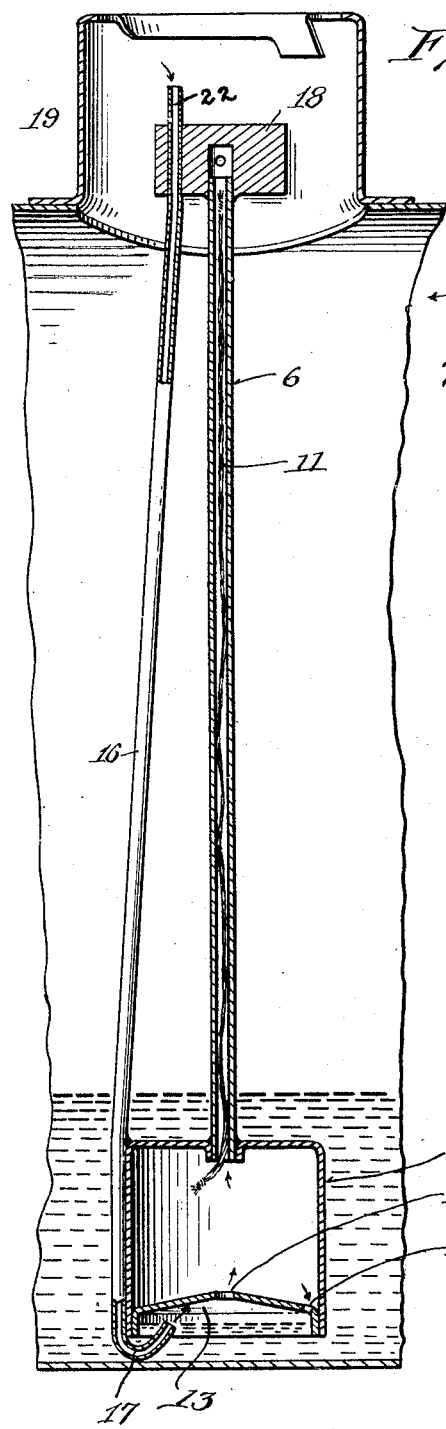
Fig. 3 is a detail vertical sectional view taken through the air-bell and connected parts.
Figure 5:
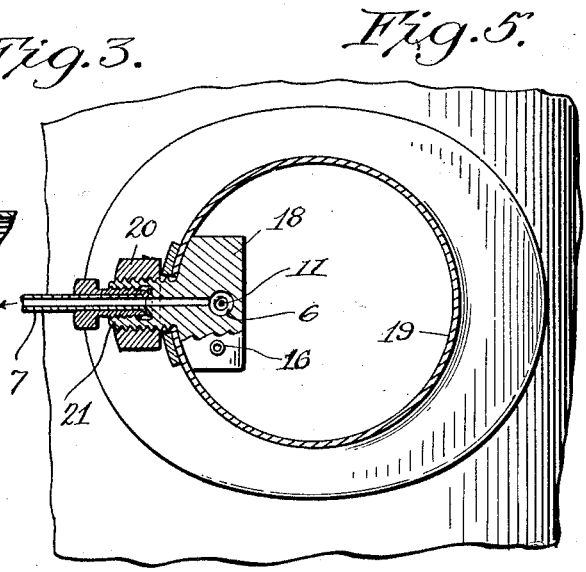
Figure 6:
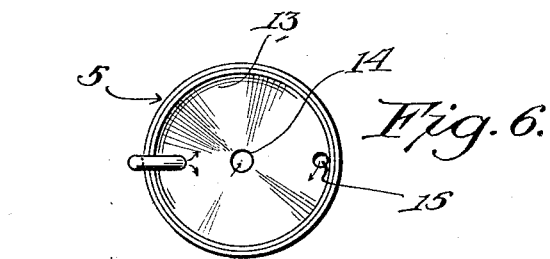
Figure 7:
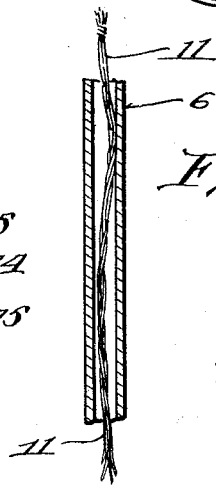

In the drawing, 5 designates the air-bell located at the bottom of the liquid-tank, usually gasoline. Arising from the dome of this bell is an air-tube 6 which is connected by means of a suitable coupling extending through the top of the tank to an air-tube 7 which leads to the pressure-leg 8 of the usual U gauge-tube 9 of the gauge 10, this gauge being usually mounted on the instrument-board of the vehicle in convenient view of the driver. As usual in this type of gauge, the hydrostatic head of gasoline in the tank determines the degree of pressure on the indicating-liquid in the gauge-tube and thus indicates in the gauge the quantity or height of the liquid in the tank.

To insure prompt discharge of any gasoline that may be held in the tube 6, I provide an emptying element 11 consisting preferably of a plural-strand wire cable which extends from the interior of the bell to a point well up in the tube 6. Frictional action will be sufficient to hold this wire in position in the tube.

At the lower end of the pressure-leg 8, the interior passage for the indicating-liquid is restricted at 12 for a portion of its length, thus narrowing the channel along this length. The purpose of this restricted passage at this point is to prevent the indicating-liquid being pushed up in the other leg of the gauge, over the top thereof, which top is open to the atmosphere, as usual. At times, the pressure in the air-tube and bell will be great enough to cause this overflow unless the indicating-leg of the gauge is made impractically long. With this restricted passage at the lower end of the pressure-leg, when the gauge-liquid in this leg reaches as low as the restricted part, for a drop lower in this leg of say one-eighth inch, there will be practically no corresponding rise of liquid in the indicating-leg. In other words, when the liquid in the pressure-leg lowers so that air enters this restricted part of the leg, the limit of rise in the gauge-glass is practically obtained. I have shown this restriction of the passage as being accomplished by flattening the tube at the point in question, but it will be understood that it may be obtained in other ways without departing from my invention.

In the bell 5, at a point above its bottom edge, is a partition 13 dished upwardly at its center and provided at said center with a small hole 14. At the edge of the partition, adjacent the wall of the bell, is provided another small hole 15. The purpose of the air-bell at the bottom of the air-tube is to afford a comparatively large air-chamber at a low level of the gasoline. This chamber is an expansion chamber for the air-line. The air confined in the line between the U-tube of the gauge element and the lower part of the gasoline-tank is almost a constant quantity. The quantity varies only by leakage or absorption or addition through the gasoline. As the quantity is constant, its volume varies with the temperature and pressure, and the pressure varies as the gasoline head in the tank varies. If a plain tube only (not shown) projected down into the gasoline, the gasoline would rise and fall in this tube considerably; then the head of gas it would record would vary likewise. By using the air-bell to increase this area, the gasoline does not rise in the air-tube 6, but stays within the vertical limits of the air-bell. Nevertheless, drops of gasoline do occasionally accumulate in the air-tube 6, and these drops of liquid in the air-tube make the registration of the gauge inaccurate, since the head of pressure under which the gauge works is very small and these drops, adhering to the stand-pipe wall, have a clogging effect that is appreciable. For this reason, it is very desirable to provide means for keeping this air-tube 6 clear or free of gasoline and full of air. It is desirable to have this air-tube 6 small in diameter—so small, in fact, that it is somewhat of a capillary tube. To insure prompt and effective draining of gasoline that may enter tube 6 under such circumstances, I provide the aforesaid emptying element 11. This wire insures the prompt discharge of any gasoline that may have been forced up into or otherwise collected in tube 6 by serving to lead or draw the gasoline downward along this wire, aided by gravity. In other words, at a cross-section, under consideration, of this air-tube, one part has a greater holding power than another. The gasoline tends to cling closer to the stranded wire at its point of contact with the tube where the interstice is larger and the pull is less, and thus a two-way circulation is established, with the result that the gasoline tends to trickle downward and the air in the bubbles tends to climb up along the other side. In practice, I have found that this is exactly what happens.

The dome-shaped floor or partition 13 in the bell aids in the circulation of air upward and gasoline downward, and another function of this partition is to decrease the floating contact of air to gasoline. The hole 14 at the high point of the partition is for the passing of air upwardly, while the hole nearer the rim is for the passing of gasoline downwardly. If only one hole were provided, there would be a tendency for a drop of gasoline or bubble of air to block the passage, whereas, by using the two holes, I provide an in and out passage. There is no jamming or confusion, each being a one-way lane. By putting one hole in the dome, it naturally becomes the exit for escape of air upward into the upper chamber of the bell, while the outer or lower hole naturally becomes the exit point for the passage of gasoline downward. This dome in the top of the lower compartment of the bell also tends to collect air bubbles as they rise and separate from the gasoline bulk in the tank. When the tank is filled or in the act of filling the tank with gasoline, air that is in the tank must go somewhere as the gasoline is poured in. Some of this air will lodge underneath the floor dome, and this trapped air will rise and replace any gasoline that may be where not wanted in the chamber above or in the tube above.

With my appliance constructed as described, to install the appliance it is only necessary to set the unit in a suitable mounting hole in the tank and couple it up to the air-line 7. This can be done with the tank full or partly filled with gasoline because of another feature, namely, an air-supply-tube 16 which is open at its upper end and is provided at its lower end with a gooseneck 17 which curves up under the bell, terminating just below the dome partition 13. By means of this tube, additional air may be supplied to the air-bell at any time by blowing down the tube 16; for this purpose, a rubber tube may be slipped onto the upper end of tube 16 and air be blown into the bell by the mouth of the operator or by means of an ordinary blower bulb. This air will be delivered under the lower dome of the bell and will rise in the bell and replace any undesirable accumulation of gasoline in the bell or the tube 6.

The coupling for connecting the air standpipe 6 to the air-line 7 consists desirably of block 18 which is adapted to be clamped against the interior of the wall of the usual filling-nipple 19 by means of a nut 20, said block being provided with a threaded nipple 21 which passes through a hole in said filling-nipple 19. This coupling block 18 forms a convenient support for the upper end of the air-tube 16, the upper extremity of this tube 16 being carried above the block to form a nipple 22 for attachment of the tube of the blower. This construction provides a simple method of attaching my appliance as a unit to the gasoline tanks now in general use on motor vehicles. The nipple 22 will thus be located down within the tubular filling nipple 19 and, while it will be out of the way, it will be in a position convenient for attaching a blower-tube to it.

It will be understood that it is desirable to keep the diameter of the tube 6 as small as possible because the larger it is the greater variation is registered because of temperature changes. In practice, I have found that this tube must be nearly 4 mm. in diameter before it will clear itself; if it is 3.5 mm. it will not clear unless it is assisted by jarring; if it is only 3 mm. it will not clear at all; hence the desirability of the use of my draining element in tubes that are under 4 mm. in diameter.

What I claim as new is:

1. In a liquid-level gauge, an air-tube leading to the gauge and having an inlet-end extending down into the liquid to be measured, and a draining element in said tube extending from a point in said tube to a point below the inlet-end thereof.

2. The combination with a liquid-level gauge apparatus embodying a gauge, an air-bell and an air-tube having its inlet-end connected to said air-bell and its outlet-end connected to the gauge, of a draining element extending from the interior of the bell up into the inlet of said tube.

3. The combination with a liquid-level gauge apparatus embodying a gauge, an air-bell and an air-tube having its inlet-end connected to said air-bell and its outlet-end connected to the gauge, of a draining element extending from the interior of the bell up into the inlet of said tube, said draining element consisting of a plurality of strands of wire.

4. A liquid-level gauge of the type set forth embodying a bell adapted to be set down in the liquid to be measured, said bell being provided with a partition located at a distance from its lower edge, said partition being dished upwardly and provided with two openings, one at the apex of the dished-portion and the other at a lower point, at one side.

5. A liquid-level gauge of the type set forth for use in gasoline tanks having a tubular filling-nipple, an air-bell adapted to be immersed in the gasoline, a stand-pipe rising from the air-bell, a coupling-block adapted to be located in said filling-nipple and detachably fastened to the interior wall-surface thereof, an air-line detachably connected to said coupling-block at one end and at its other end through the wall of said nipple to the gauge element, and a tube for supplying additional air from time to time to the air-bell mounted in said coupling-block and having its lower end arranged to deliver air under said bell.

In testimony whereof I hereunto affix my signature.

WILLIAM H. BROWN.